(No Model.) 2 Sheets—Sheet 1.

W. E. BAXTER.
COOKING APPARATUS.

No. 561,856. Patented June 9, 1896.

WITNESSES:
M. D. Blondel
P. B. Turpin

INVENTOR
William E. Baxter
BY Munn & Co.
ATTORNEYS (No Model.) 2 Sheets—Sheet 2.
W. E. BAXTER.
COOKING APPARATUS.
No. 561,856. Patented June 9, 1896.
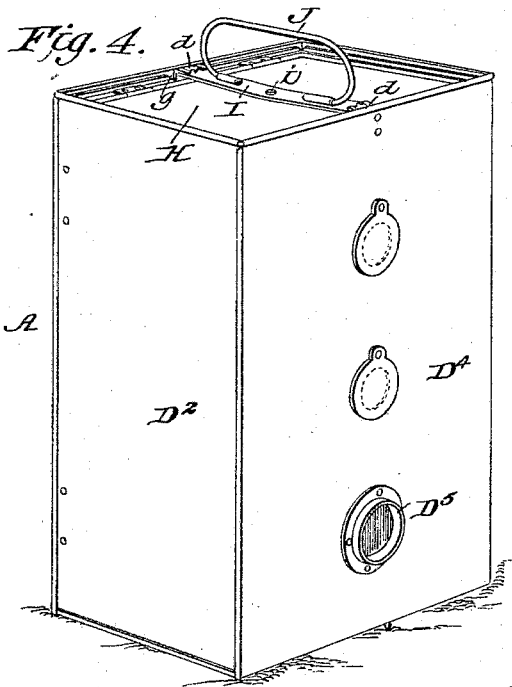
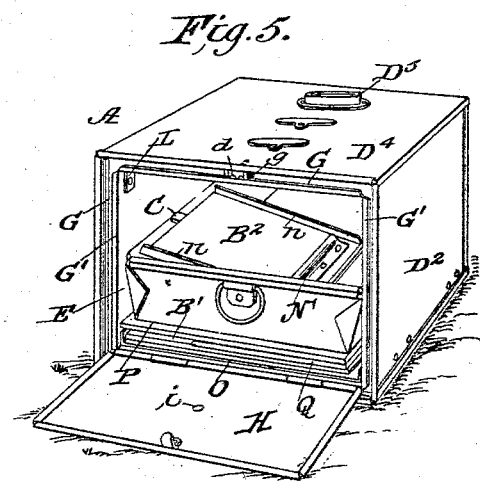
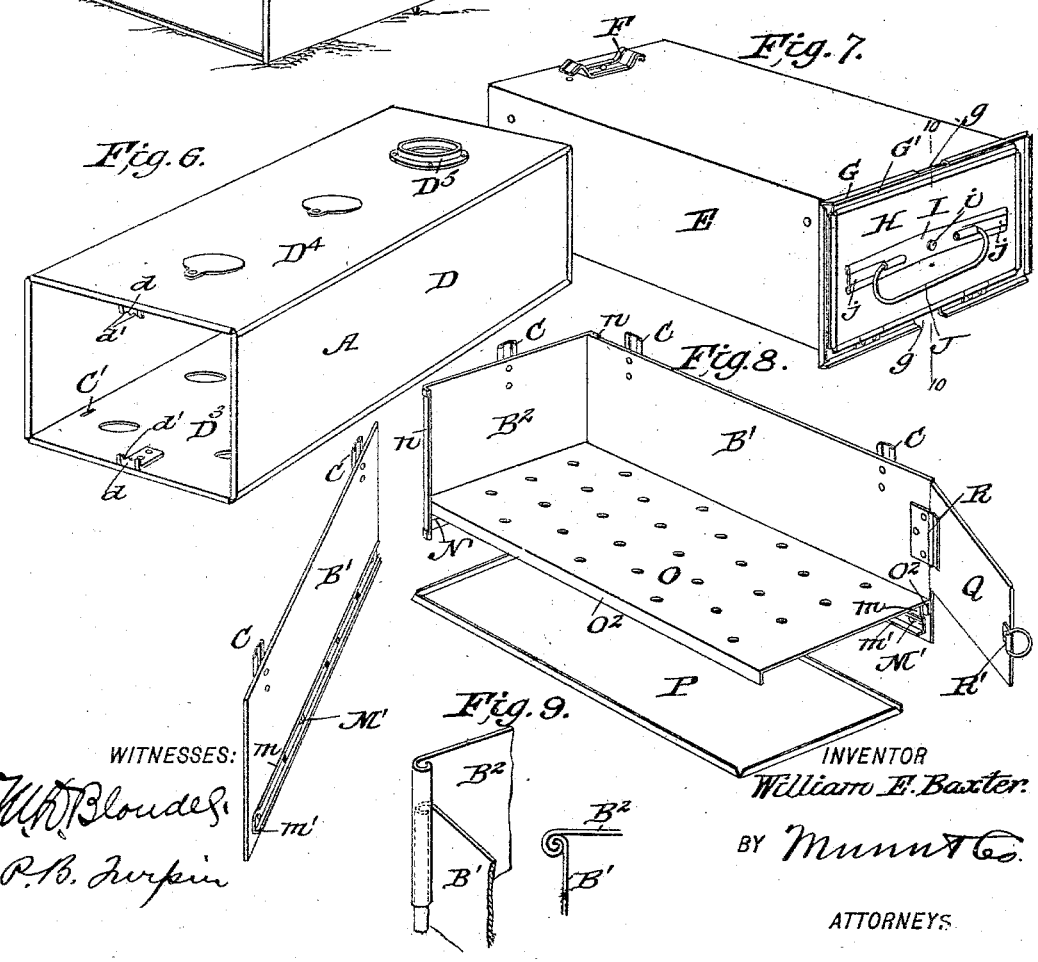
WITNESSES:
INVENTOR
William E. Baxter.
BY Munn & Co.
ATTORNEYS

UNITED STATES PATENT OFFICE.

WILLIAM E. BAXTER, OF FRANKFORT, KENTUCKY.

COOKING APPARATUS.

SPECIFICATION forming part of Letters Patent No. 561,856, dated June 9, 1896.

Application filed February 18, 1895. Serial No. 538,850. (No model.)

*To all whom it may concern:*

Be it known that I, WILLIAM E. BAXTER, of Frankfort, in the county of Franklin and State of Kentucky, have made certain new and useful Improvements in Cooking Apparatus, of which the following is a specification.

The invention is in the nature of a cooking apparatus for campers, for house use, and for wood, charcoal, gas, oil, &c., wherein are provided an oven and a stove, the stove being formed in detachable sections, and such sections being adapted when separated to be stored within the oven, the oven being also adapted to contain pans, dishes, &c., sufficient to constitute a limited camp-kit, the whole being adapted for compact storage, adapting the improvement for pleasure or army camp purposes, as will be understood from the following description.

The invention consists in certain features of construction and novel combinations of parts, as will be described, and pointed out in the claims.

Figure 1:
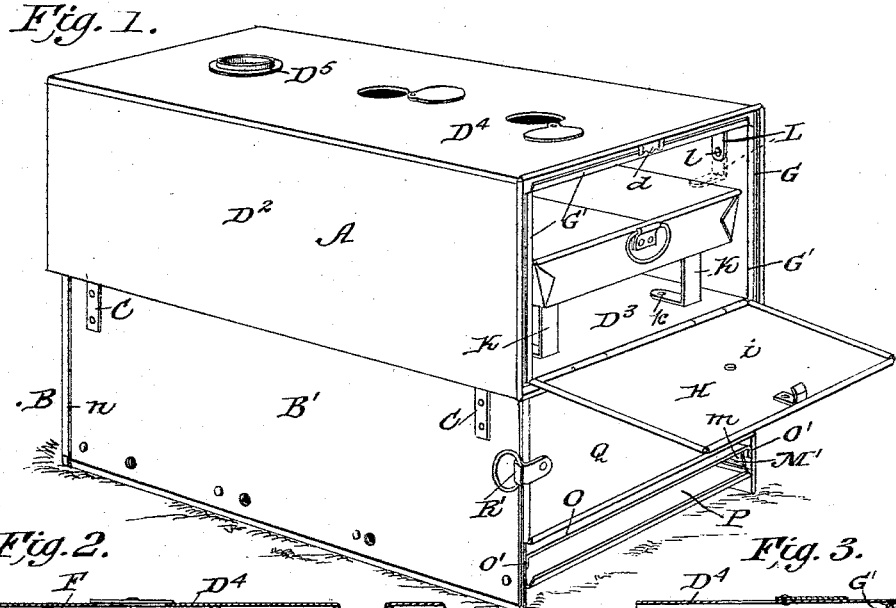
Figure 2:
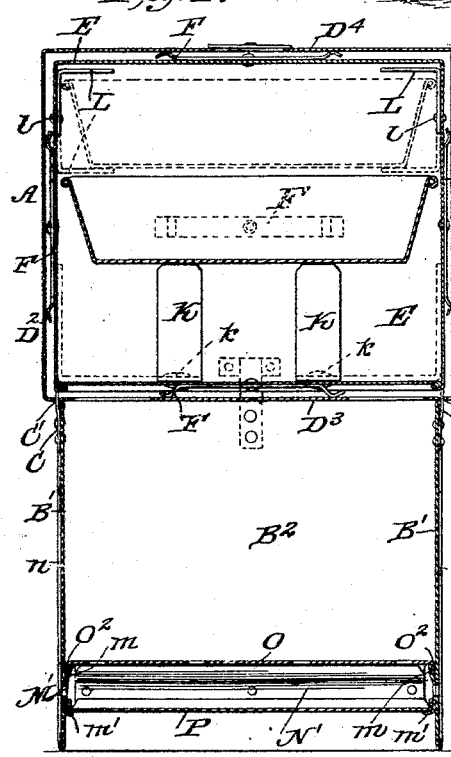
Figure 3:
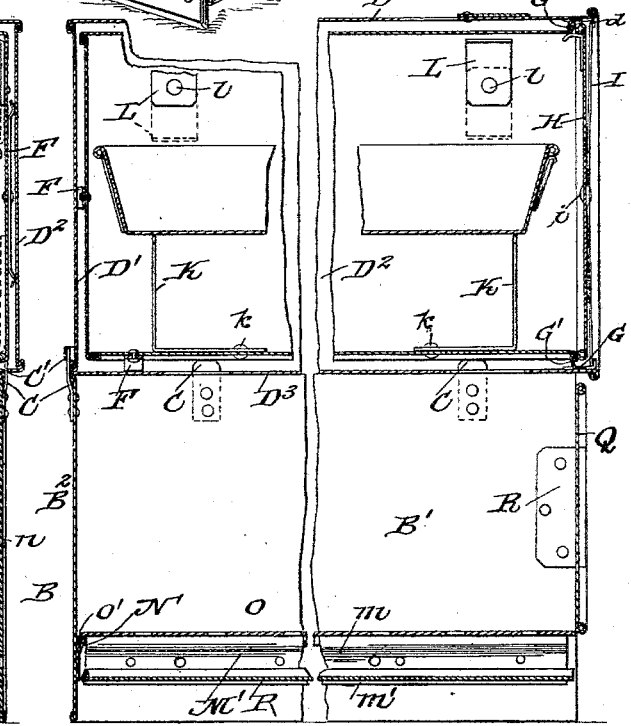
Figure 10:
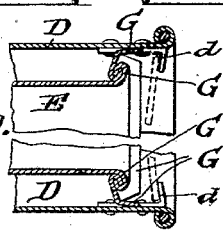

In the drawings, Figure 1 is a perspective view of the apparatus ready for use. Fig. 2 is a vertical cross-section on about line 2 2 of Fig. 1. Fig. 3 is a vertical longitudinal section on about line 3 3 of Fig. 1. Fig. 4 shows the parts packed ready for storage or carrying from point to point. Fig. 5 is a perspective view of the parts packed, the door of the oven being open. Fig. 6 is a perspective view of the oven-shell. Fig. 7 is a perspective view of the inner casing. Fig. 8 is a perspective view illustrating the stove, some of the parts being detached. Fig. 9 shows a different form of joint between the sides and end of the stove, and Fig. 10 is a detached section on about line 10 10, Fig. 7.

My apparatus comprises an oven A and a stove B, the stove being detachably connected with the oven, preferably by means of projections C on one part entering sockets or seats C' on the other. As shown and preferred, the sockets C' are downwardly-opening seats formed in the under side of the oven-shell, and the sides B' and the end B² of the stove have dowel-like projections C entering said seats C', the stove being thus detachably engaged with the oven in such manner as to permit the easy separation of the oven and stove, the oven serving at the same time to retain the sections of the stove in engagement, as will more fully appear hereinafter.

The oven A is formed with a shell D and an inner casing E. The shell is preferably formed with an imperforate end D' and sides D², and its bottom and top D³ D⁴ are perforated to cause draft and permit the circulation of heat from beneath through and out of the top of the shell. To facilitate the application of a stovepipe where desired, a nipple D⁵ may be provided around one of the top openings to receive such pipe, the others being closed. At its open end, which may preferably be stoutly wired, the shell is provided with inwardly-projecting lugs or bolt-seats $d$, which coöperate with the fastening-bolts presently described in securing the casing E within the shell. These lugs $d$ and the fastening-bolt are preferably formed with interengaging portions—it may be corrugations on the one and teeth on the other, as shown—to prevent any accidental displacement of such parts from locked position. This shell is preferably made of stout sheet-iron.

The inner casing is fitted in the open end of the shell and is provided with spacing-pieces F, by which it is held separated a suitable distance from the walls of the shell. The spacing or separating pieces F are bendable, so they may be adjusted conveniently to hold the casing at any suitable distance from the shell, being to such end secured with their ends free, so such ends may be easily bent to secure the desired adjustment. While these spacing-pieces might be secured in such manner as to leave only one end to form a spacing-strip, it is preferred to make them somewhat in U shape and secure them between their ends to the inner casing, so both ends may be bent as desired. While for convenience in inserting and removing the casing it is preferred to secure said spacing-strips to such casing, it is manifest they might be secured to the inner side of the shell without departing from some of the broad principles of my invention.

The casing, as stated, fits in the outer open end of the shell and is in turn provided at its end with a flange G, projecting outwardly and lapping against the open end of the shell, thus serving to prevent exit of smoke or gases at the front of the oven. This flange has notches $g$ to pass the lugs $d$ and preferably has a subflange G', forming somewhat a seat-frame for the hinged door H of the inner casing. As will be seen, the inner casing fits removably in the shell, which allows for thorough cleaning, and I provide it with a fastening, by which it may be locked in position in such shell. This fastening is preferably a bolt I, pivotally secured with relation to the casing and movable into and out of engagement with the shell. As shown, this bolt is supported on the hinged door H of the casing, and it is preferred to pivot the bolt at $i$ centrally between its ends, so both ends thereof may be turned into engagement with the oven-shell. It is also preferred to provide this bolt with a handle J and to connect that handle with the bolt on opposite sides of the pivot, so the handle may be utilized in turning the bolt into and out of locked position, as well as for a handhold in carrying the oven when packed for storage and for manipulating the door of the inner casing. The bolt I is preferably formed of spring metal bent upward at its ends to cause it to operate with a spring action beneath the seats $d$ of the shell, and such bolt has at its ends corrugations or the like $j$ coöperating with teeth $d'$ on the lugs $d$ to prevent displacement accidentally of the bolt. When the shell is in packed condition, with the casing, stove-sections, and other portions of the kit therein, and the bolt is in engagement with the lugs $d$, the whole being borne by the handle, it is evident that the greater the strain on the handle the more firmly will such bolt be held in contact with the lugs of the shaft, preserving the parts securely in stored position. Within this casing I provide pan-supports adjustably secured, so they may be set to position to support the pan the height from bottom of oven to cause the bread to bake uniformly or from such position against the wall to leave the interior space of the casing unobstructed for purposes of storage. I also provide an upper row of supports and a lower row, the supports K of the lower row being made double-armed or L-shaped and having their horizontal arms pivoted at $k$ upon the bottom of the inner casing in such position that the other arms may be swung alongside the side walls of such casing out of the way, or may be swung inward to support the pan upon their upper ends. The upper supports L are also L-shaped, and have their upright arms pivoted at $l$ to the side of the casing, so their horizontal arms may be swung up against the top of the casing, or down to form rests for an upper pan, as will be readily understood. It is evident that these supports may be readily adjusted to support the pans, and when turned out of position for such use will form practically no obstruction within the casing, but will leave the same free for the insertion of the detached parts of the stove, pans, &c. The inner face of the sides, top, and end of the oven are of bright tin or other burnished material, forming an efficient heat-reflecting surface. The bottom of the case is made preferably of sheet-iron.

The stove is formed with the sides B', end $B^2$, bottom, and door. The end $B^2$ has at its upper end a projection C to enter the socket C' of the oven, and has at its ends the narrow forwardly-projecting flanges $n$. This end $B^2$ also has near its bottom a seat N' for engagement by the flange O' on the rear edge of the grate O, such grate being also provided with depending flanges $O^2$. The sides are provided at their upper edges with projections C, fitting the slits in bottom C' of the oven, and are provided on their inner sides, near their lower edges, with seats for the grate and ash-pan of the stove. The rear and side flanged edges of the grate lap inside the edge flanges $n$ of the end $B^2$ and side seats. Now the bottom of the stove may be the ground or material on which end and side pieces are placed, or the grate, or may be a separate ash-pan P, when such pan is desired, and the seats on the inner side of the sides B' are preferably formed by a strip M', having upper seat $m$ for the flanges $O^2$ of the grate O and flanges $m'$ constituting the lower seat to support the ash-pan. One of the sides M has a hinged door Q, which serves to close the front of the stove. It is evident that the stove, being formed in sections engaging each other, as described, may be readily taken apart, and when so taken apart may be stored within the inner casing E, such casing E being fitted and held in the shell D; also, that when the stove is detached and stored in the casing E there is left within such casing sufficient room to receive several nested pans, plates, cups and saucers, knives, forks, and spoons, coffee-pot, bucket, and other serving and cooking articles common to a camp-kit.

The door of the stove is hinged at R to one of the sides M, and is provided at its swinging edge with a spring latch-like portion R', which catches on the front edge of the other side B' and tends to lock the sides securely together at the front, the rear ends of such sides being held by the flanges $n$ on the rear edge of the side pieces B'.

Instead of the joint between the side pieces B' and the end $B^2$, as shown, such joint may be a sliding joint, as shown in Fig. 9.

The flanges of grate in engaging the side and end seats or flanges of sides and end of stove secure the end and side pieces of stove in position. The side pieces have ventilation or draft holes, as shown.

Having thus described my invention, what I claim is—

1. The combination with the oven having an outer casing provided at its open end with inwardly-projecting lugs, the inner casing or shell fitted removably in the outer casing and having at its free end a flange overlapping the open end of the outer casing and having notches or openings for the lugs of the outer shell, the door hinged to the inner shell and the bolt pivoted to said door and turning into engagement with the lugs whereby to hold the door closed, and the inner shell within the outer one substantially as set forth.

2. The combination with the oven having downwardly-opening seats along its sides and at its rear end, the stove back and sides having at their top edges dowels or tenons engaging the oven-seats and provided with upwardly-facing hook-like seats and the grate having edge portions engaging the said hook-like seats, the stove-back being provided at its ends with flanges overlapping the rear edges of the sides all substantially as and for the purposes set forth.

3. In a portable cooking apparatus, the combination with the shell having at its open end inwardly-projected lugs or bolt-seats, of the inner casing or chamber fitted in the open end of the shell and provided at its outer end with a projecting flange-like portion abutting and closing the space between said casing or chamber and the end of the shell and provided with slots for the passage of the lugs or bolt-seats, substantially as set forth.

4. In a portable cooking apparatus, the combination with the shell, of the inner casing fitting thereto such casing being provided with a door and a fastening supported on said door and adapted to lock the inner casing to the outer shell, substantially as set forth.

5. In a portable cooking apparatus, the combination with the shell, of the inner casing fitted thereto and provided with a door and a fastening consisting of a bolt pivoted to said door and turning into engagement with the shell whereby to lock the inner casing to the shell, substantially as set forth.

6. In a cooking apparatus, the oven having an outer shell, an inner casing or chamber fitted removably to said shell and having a door and a bolt pivoted to said door and having a handle, said bolt being supported to turn into and out of engagement with the shell, substantially as set forth.

7. In a cooking apparatus, the combination of the outer oven-shell, the inner casing fitted removably to said shell, the door hinged to said inner casing and the bolt pivoted to the door and turning into and out of engagement with the shell, such bolt having a handle located with respect to its pivot substantially as described whereby it may be utilized to set the bolt into and out of locked position as well as for carrying the oven and whereby the weight in carrying may tighten the bolt in fastened position substantially as set forth.

8. In a cooking apparatus, an oven provided internally with adjustably-supported pan-seats movable into position to support the pan, or against the inner walls of the oven when it is desired to leave the oven unobstructed for packing purposes, substantially as set forth.

9. In a cooking apparatus, the oven provided with upper and lower rows of pan-seats connected adjustably to the oven and movable from position against the walls thereof, out to position to support the pans, substantially as set forth.

10. In a cooking apparatus, the oven provided with adjustable pan-seats composed of double-armed brackets having one arm pivoted to one wall of the oven and the other arm swinging adjacent to the adjoining oven-wall or out therefrom to position to support the pan, substantially as set forth.

11. In a cooking apparatus, the oven provided upon its bottom with L-shaped seats, one arm of the seat being pivoted to the bottom and the other arm movable to a position adjacent to the side wall or out therefrom, substantially as set forth.

12. In a cooking apparatus, the oven provided internally with pan-seats arranged near its top and composed of L-shaped brackets having their vertical arms pivoted horizontally to the side of the oven and their horizontal arms swinging up against the oven-top or down to form horizontal seats on which to rest the pans, all substantially as and for the purpose set forth.

13. In a cooking apparatus, the oven provided with the pan-supports adjustable to position to support the pans or out of the way to increase the storage-space in the oven and the stove composed of separate sections adapted when detached to be stored in the oven, substantially as and for the purposes set forth.

14. In a portable cooking apparatus, a stove composed of side pieces having longitudinal seats arranged one above the other, the grate engaging the upper seats, the ash-pan engaging the lower seats and the end pieces, substantially as set forth.

15. In a portable cooking apparatus, the stove composed of the sides provided with longitudinal strips, the opposite edges of which are bent forming seats, the grate having depending flanges engaging the upper seats, the ash-pan resting upon the lower seats and the end, substantially as set forth.

16. A stove having separable sides and a door hinged to one side and provided with a spring-catch engaging the other side, substantially as described.

17. In a cooking apparatus, the combination with the oven having downwardly-opening seats or sockets at its lower edge and the stove having its sides and end portion provided with dowel-like projections entering said seats and the bottom engaging said sides and end pieces, substantially as set forth.

WILLIAM E. BAXTER.

Witnesses:
D. W. LINDSEY, Jr.,
JOHN B. LINDSEY.